(12) United States Patent
Loos et al.

(10) Patent No.: US 9,096,758 B2
(45) Date of Patent: Aug. 4, 2015

(54) BIODEGRADABLE POLYESTER FOIL

(75) Inventors: Robert Loos, Ludwigshafen (DE); Xin Yang, Bensheim (DE); Jörg Auffermann, Freinsheim (DE); Franziska Freese, Mannheim (DE)

(73) Assignee: BASF SE (DE)

( * ) Notice: Subject to any disclaimer, the term of this patent is extended or adjusted under 35 U.S.C. 154(b) by 346 days.

(21) Appl. No.: 13/559,058

(22) Filed: Jul. 26, 2012

(65) Prior Publication Data

US 2013/0029124 A1     Jan. 31, 2013

Related U.S. Application Data

(60) Provisional application No. 61/512,935, filed on Jul. 29, 2011.

(51) Int. Cl.
| | |
|---|---|
| *C08K 3/26* | (2006.01) |
| *C08K 3/34* | (2006.01) |
| *B32B 1/02* | (2006.01) |
| *C08L 67/02* | (2006.01) |
| *B29C 47/00* | (2006.01) |
| *B29C 47/82* | (2006.01) |

(52) U.S. Cl.
CPC ............ *C08L 67/02* (2013.01); *B29C 47/0026* (2013.01); *B29C 47/0057* (2013.01); *B29C 47/827* (2013.01); *B29C 2947/92704* (2013.01); *B29K 2995/006* (2013.01); *B29K 2995/0056* (2013.01); *Y10T 428/1372* (2015.01)

(58) Field of Classification Search
CPC .. C08K 2003/265; C08K 3/34; C08K 5/3492; C08K 3/26; C08L 67/02; C08L 67/03; C08L 67/04; B65D 1/00
USPC .......................... 428/36.4; 524/100, 425, 451
See application file for complete search history.

(56) References Cited

U.S. PATENT DOCUMENTS

| | | | |
|---|---|---|---|
| 5,883,199 A | 3/1999 | McCarthy | |
| 6,235,815 B1 | 5/2001 | Loercks | |
| 7,368,503 B2 | 5/2008 | Hale | |
| 2009/0018235 A1 | 1/2009 | Nascimento | |
| 2010/0324220 A1 | 12/2010 | Toyohara | |
| 2011/0189414 A1* | 8/2011 | Whitehouse | 428/35.7 |
| 2012/0202928 A1 | 8/2012 | Loos et al. | |

FOREIGN PATENT DOCUMENTS

| | | |
|---|---|---|
| CA | 2779361 A1 | 5/2011 |
| CN | 101508791 A | 8/2009 |
| WO | 2007095709 | 8/2007 |
| WO | WO-2009071475 A1 | 6/2009 |
| WO | 2009135921 | 11/2009 |
| WO | WO-2009135921 A1 | 11/2009 |
| WO | WO-2009137058 A1 | 11/2009 |
| WO | 2010118041 | 10/2010 |
| WO | WO-2010/118041 A1 | 10/2010 |
| WO | 2010151811 | 12/2010 |
| WO | WO-2011/045293 A1 | 4/2011 |
| WO | WO-2011/054786 A1 | 5/2011 |
| WO | WO-2011117203 A1 | 9/2011 |
| WO | 2011160053 | 12/2011 |

OTHER PUBLICATIONS

U.S. Appl. No. 13/070,970, filed Mar. 24, 2011, Ren et al.
U.S. Appl. No. 13/508,658, filed May 8, 2012, Jörg Auffermann.
U.S. Appl. No. 13/467,550, filed May 9, 2012, Franziska Freese.
U.S. Appl. No. 13/559,058, filed Jul. 26, 2012, Robert Loos.
Search Report from European Patent Office for registration No. EP11175967, dated Dec. 6, 2011.

* cited by examiner

*Primary Examiner* — Walter B Aughenbaugh
(74) *Attorney, Agent, or Firm* — Drinker Biddle & Reath LLP

(57) ABSTRACT

The present invention relates to biodegradable polyester foil comprising:
i) 80 to 95 weight %, based on the total weight of components i to ii, of a biodegradable polyester based on aliphatic and aromatic dicarboxylic acids and on an aliphatic dihydroxy compound;
ii) 5 to 20 weight %, based on the total weight of components i to ii, of polyhydroxyalkanoate;
iii) 10 to 25 weight %, based on the total weight of components i to vi, of calcium carbonate;
iv) 3 to 15 weight %, based on the total weight of components i to vi, of talc;
v) 0 to 30 weight %, based on the total weight of components i to vi, of polylactic acid and/or starch;
vi) 0 to 2 weight %, based on the total weight of components i to vi, of 2-(4,6-bisbiphenyl-4-yl-1,3,5-triazine-2-yl)-5-(2-ethyl-(n)-hexyloxy)phenol;
and to uses of these polyester foils, in particular for agricultural applications, such as mulch foils.

9 Claims, No Drawings

BIODEGRADABLE POLYESTER FOIL

CROSS-REFERENCE TO RELATED APPLICATIONS

This application claims the benefit of U.S. Provisional Application 61/512,935, filed Jul. 29, 2011, which is incorporated herein by reference.

BACKGROUND OF THE INVENTION

The present invention relates to a biodegradable polyester foil comprising:
i) from 80 to 95% by weight, based on the total weight of components i to ii, of a biodegradable polyester based on aliphatic and aromatic dicarboxylic acids and on an aliphatic dihydroxy compound;
ii) from 5 to 20% by weight, based on the total weight of components i to ii, of polyhydroxyalkanoate;
iii) from 10 to 25% by weight, based on the total weight of components i to vi, of calcium carbonate;
iv) from 3 to 15% by weight, based on the total weight of components i to vi, of talc;
v) from 0 to 30% by weight, based on the total weight of components i to vi, of polylactic acid and/or starch;
vi) from 0 to 2% by weight, based on the total weight of components i to vi, of 2-(4,6-bisbiphenyl-4-yl-1,3,5-triazin-2-yl)-5-(2-ethyl-(n)-hexyloxy)phenol.

The invention further relates to the use of these polyester foils, in particular for agricultural applications, such as mulch foils.

Polyester foils (chill-roll foils of thickness 250 micrometers) made of components i and ii have been mentioned in EP-A 2 330 157. Specifically, mixtures in the range from 25 to 75% by weight of aliphatic-aromatic polyesters (component i) and from 25 to 75% by weight of polyhydroxyalkanoate (component ii), preferably poly(3-hydroxybutyrate-co-3-hydroxyhexanoate), are disclosed. However, those foils are not entirely satisfactory in particular in respect of tear-propagation properties.

It was an object of the present invention to provide biodegradable polyester foils with improved tear-propagation properties.

Surprisingly, it has been found that the polyester foils mentioned in the introduction, with only from 5 to 20% by weight polyhydroxyalkanoate content, have better tear-propagation properties.

It has also been found that still further improvement in tear-propagation properties can be achieved if from 10 to 25% by weight, based on the total weight of components i to v, of calcium carbonate (component iii) is added to the foils of the invention.

WO2002/016468 discloses filled biodegradable polyester foils. WO2010/118041 discloses that addition of high-purity calcium carbonate increases the processing latitude of polyhydroxyalkanoates. WO2010/118041 gives no indication of the effect of the calcium carbonate on the tear-propagation properties of foils made of polyhydroxyalkanoates, and in particular of foils based on the mixture of the invention made of aliphatic-aromatic polyesters and of polyhydroxyalkanoates.

Another object of the present invention was to develop polyester mixtures which have good processability when processed to give blown films. Blowing is usually used to produce thin foils, i.e. foils of thickness smaller than 50 micrometers or preferably smaller than 30 micrometers. This process requires polymer mixtures which exhibit a certain viscosity and bubble stability.

DETAILED DESCRIPTION OF THE INVENTION

The present invention further relates to polymer mixtures which have extremely good bubble stability and which comprise, alongside abovementioned components i to iii, from 3 to 15% by weight, based on the total weight of components i to v, of talc.

None of the abovementioned specifications gives any indication of the advantageous combination of the fillers calcium carbonate (component iii) and talc (component iv).

Biodegradable polyester foils can be used by way of example as agricultural foils. A decisive requirement here, in particular for transparent agricultural foils, alongside the requirement for high tear-propagation resistance, is resistance to sunlight. Black-(carbon-black-)colored agricultural foils intrinsically exhibit a UV-absorbing effect, but thermal radiation is also absorbed, and less heat is therefore transmitted to the soil, and the yield/earlier-harvesting effect that can be achieved, at least for particular crops such as melons and maize, is reduced.

UV absorbers (vi) used in particular for agricultural applications are those which have exceptional absorption capability and which are based on an extremely stable chromophore which belongs to the triazines class. This UV absorber is superior to all other UV absorbers currently used in the wavelength range of 290 and 350 nanometers, because it has very high absorbance and also a very broad absorption curve. The UV absorber also provides excellent light resistance and low volatility, and there is therefore hardly any alteration of absorption capability over the course of time.

WO 2009/071475 discloses agricultural foils which are based on, for example, polyethylene and which comprise hydroxyphenyltriazines as stabilizer. Polyester films based on PMMA are likewise mentioned in WO 2009/071475. WO 2009/071475 does not explicitly describe biodegradable polyester films. Practical service times of biodegradable transparent agricultural films based on a biodegradable polyester consisting of aliphatic and/or aromatic dicarboxylic acids and of aliphatic dihydroxy compound are often excessively short: only two weeks, depending on wall thickness. Light stabilizers recommended for the UV stabilization of agricultural foils are usually those such as UV absorbers and HALS stabilizers, or a combination of the two. UV absorbers filter the ultraviolet content out from the light, and the energy of the absorbed light is therefore converted into heat. The use of HALS stabilizers suppresses the reaction of cleavage products formed photooxidatively within the polymer. The combination of the active ingredients mentioned achieves a synergistic effect in suppressing the two different degradation mechanisms. Studies on semiaromatic polyester with trademark Ecoflex® (BASF SE) have demonstrated that even when hydroxyphenyltriazine-based UV absorbers, such as Tinuvin® 1577, are combined with a HALS stabilizer, such as Tinuvin® 111, or UV absorber based on benzophenones, e.g. Uvinul® 3008, although the result is a certain stabilizing effect this is not by any means adequate for transparent agricultural foils, in particular with low wall thickness.

Said agricultural foils are moreover not entirely satisfactory in respect of their tear-propagation resistance, especially in thin embodiments (below 30 microns).

Another object of the present invention was therefore to provide biodegradable, preferably transparent agricultural foils with longer service times in the field and with higher tear-propagation resistance.

Accordingly, the biodegradable polyester foil comprising:
i) from 80 to 95% by weight, preferably from 85 to 95% by weight, based on the total weight of components i to ii, of a biodegradable polyester based on aliphatic and/or aromatic dicarboxylic acids and on an aliphatic dihydroxy compound;
ii) from 5 to 20% by weight, preferably from 5 to 15% by weight, based on the total weight of components i to ii, of polyhydroxyalkanoate;
iii) from 10 to 25% by weight, preferably from 10 to 20% by weight, particularly preferably from 15 to 20% by weight, based on the total weight of components i to vi, of calcium carbonate;
iv) from 3 to 15% by weight, preferably from 5 to 10% by weight, particularly preferably from 5 to 8% by weight, based on the total weight of components i to vi, of talc;
v) from 0 to 30% by weight, preferably from 3 to 15% by weight, particularly preferably from 5 to 10% by weight, based on the total weight of components i to vi, of polylactic acid and/or starch;
vi) from 0 to 2% by weight, preferably from 0.1 to 1.5% by weight, particularly preferably from 0.5 to 1.2% by weight, based on the total weight of components i to vi, of 2-(4,6-bisbiphenyl-4-yl-1,3,5-triazin-2-yl)-5-(2-ethyl-(n)-hexyloxy)phenol has been developed.

The use of component vi is advisable only for foils which have long-term exposure to sunlight, examples being agricultural foils.

Accordingly, a preferred discovery is agricultural foils of claim 5 with components i to vi, which have been improved not only in respect of their tear-propagation resistance but also in respect of their service time in the field.

A more detailed description of the invention is given below.

Materials that can in principle be used as component i for producing the biodegradable polyester mixtures of the invention are any of the polyesters which are known as semiaromatic polyesters and which are based on aliphatic and aromatic dicarboxylic acids and on aliphatic dihydroxy compound. A feature shared by said polyesters is that they are biodegradable to DIN EN 13432. Mixtures of a plurality of polyesters of this type are, of course, also suitable as component i.

In the invention, the expression "semiaromatic polyesters" (component i) is also intended to mean polyester derivatives, such as polyetheresters, polyesteramides, or polyetheresteramides, and polyester urethanes. Among the suitable semiaromatic polyesters are linear non-chain-extended polyesters (WO 92/09654). Preference is given to chain-extended and/or branched semiaromatic polyesters. The latter are known from the specifications mentioned in the introduction, WO 96/15173 to 15176, 21689 to 21692, 25446, 25448, or WO 98/12242, expressly incorporated herein by way of reference. It is also possible to use mixtures of various semiaromatic polyesters. Relatively recent developments of interest are based on renewable raw materials (see WO-A 2006/097353, WO-A 2006/097354, and also WO-A 2010/034710). The expression "semiaromatic polyesters" in particular means products such as Ecoflex® (BASF SE) and Eastar® Bio, and Origo-Bi® (Novamont).

Among the particularly preferred semiaromatic polyesters are polyesters which comprise, as essential components,
A) an acid component made of:
a1) from 30 to 99 mol % of at least one aliphatic dicarboxylic acid or ester-forming derivatives thereof, or a mixture thereof,
a2) from 1 to 70 mol % of at least one aromatic dicarboxylic acid or ester-forming derivative thereof, or a mixture thereof, and
B) from 98 to 102 mol %, based on acid component A, of a diol component B selected from at least one C2-C12-alkanediol or a mixture thereof
and
C) from 0.01 to 3% by weight, based on components A and B, of a component C selected from
c1) a compound having at least three groups capable of ester formation or of amide formation,
c2) a di- or polyisocyanate,
c3) a di- or polyepoxide,
or a mixture made of c1) to c3).

Compounds which can be used as aliphatic acids or as the corresponding derivatives a1 are generally those having from 2 to 18 carbon atoms, preferably from 4 to 10 carbon atoms. They can be either linear or branched compounds. In principle, however, it is also possible to use dicarboxylic acids having a larger number of carbon atoms, for example having up to 30 carbon atoms.

Examples that may be mentioned are: oxalic acid, malonic acid, succinic acid, glutaric acid, 2-methylglutaric acid, 3-methylglutaric acid, α-ketoglutaric acid, adipic acid, pimelic acid, azelaic acid, sebacic acid, brassylic acid, fumaric acid, 2,2-dimethylglutaric acid, suberic acid, diglycolic acid, oxaloacetic acid, glutamic acid, aspartic acid, itaconic acid, and maleic acid. It is possible here to use the dicarboxylic acids or ester-forming derivatives thereof, individually or in the form of a mixture made of two or more thereof.

It is preferable to use succinic acid, adipic acid, azelaic acid, sebacic acid, brassylic acid, or respective ester-forming derivatives thereof, or a mixture thereof. It is particularly preferable to use succinic acid, adipic acid, or sebacic acid, or respective ester-forming derivatives thereof, or a mixture thereof. Succinic acid, azelaic acid, sebacic acid, and brassylic acid have the additional advantage that they are obtainable from renewable raw materials.

The aromatic dicarboxylic acids or ester-forming derivatives thereof a2 can be used individually or in the form of a mixture made of two or more thereof. It is particularly preferable to use terephthalic acid or ester-forming derivatives thereof, e.g. dimethyl terephthalate.

The diols B are generally selected from branched or linear alkanediols having from 2 to 12 carbon atoms, preferably from 4 to 6 carbon atoms, or from cycloalkanediols having from 5 to 10 carbon atoms.

Examples of suitable alkanediols are ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, and in particular ethylene glycol, 1,3-propanediol, 1,4-butanediol, and 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol, and 2,2,4,4-tetramethyl-1,3-cyclobutanediol. Particular preference is given to 1,4-butanediol, particularly in combination with adipic acid as component a1), and 1,3-propanediol, particularly in combination with sebacic acid as component a1). 1,3-Propanediol also has the advantage that it is obtainable in the form of renewable raw material. It is also possible to use a mixture of various alkanediols.

Particular preference is given to the following aliphatic-aromatic polyesters: polybutylene adipate terephthalate (PBAT), polybutylene azelate terephthalate, (PBAzT), polybutylene sebacate terephthalate (PBSeT), and polybutylene succinate terephthalate (PBST).

The preferred semiaromatic polyesters i are characterized via a molar mass (Ma) in the range from 1000 to 100000, in particular in the range from 9000 to 75000 g/mol, preferably in the range from 10000 to 50000 g/mol, and by a melting point in the range from 60 to 170° C., preferably in the range from 80 to 150° C.

Polyhydroxyalkanoates (component ii) are primarily poly-4-hydroxybutyrates and poly-3-hydroxybutyrates, and copolyesters of the abovementioned polyhydroxybutyrates with 3-hydroxyvalerate, 3-hydroxyhexanoate, and/or 3-hydroxyoctanoate. Poly-3-hydroxybutyrates are marketed by way of example by PHB Industrial with trademark Biocycle® and by Tianan as Enmat®.

Poly-3-hydroxybutyrate-co-4-hydroxybutyrates are in particular known from Metabolix. They are marketed with trademark Mirel®.

Poly-3-hydroxybutyrate-co-3-hydroxyhexanoates are known from P&G or Kaneka.

Poly-3-hydroxybutyrate-co-3-hydroxyhexanoates generally have from 1 to 20 mol %, preferably from 3 to 15 mol %, content of 3-hydroxyhexanoate, based on component ii. Particular preference is given to 3-hydroxyhexanoate content of from 10 to 13 mol %. Poly-3-hydroxybutyrate-co-3-hydroxyhexanoates are particularly preferred for the polyester foils of the invention. These provide transparent foils having very good tear-propagation resistance when they are combined with component i, and also optionally components iii, iv, and vi.

The molecular weight $M_w$ of the polyhydroxyalkanoates is generally from 100 000 to 1 000 000 and preferably from 300 000 to 600 000.

The amount used of component ii is from 5 to 20% by weight, preferably from 5 to 15% by weight, based on the total weight of components i to ii. Accordingly, the amount used of component i is from 80 to 95% by weight, preferably from 85 to 95% by weight, based on the total weight of components i to ii.

Component iii used comprises from 10 to 25% by weight, preferably from 10 to 20% by weight, particularly preferably from 15 to 20% by weight, based on the total weight of components i to vi, of calcium carbonate. A difference from the description in WO2010/118041 is that no significance is attached to high purity of, and low heavy metal content in, the calcium carbonate used. One of the calcium carbonates that has proven suitable comes from Omya. The average particle size of the calcium carbonate is generally from 0.5 to 10 micrometers, preferably from 1 to 5 micrometers, particularly preferably from 1 to 2.5 micrometers.

Component iv used comprises from 3 to 15% by weight, preferably from 5 to 10% by weight, particularly preferably from 5 to 8% by weight, based on the total weight of components i to v, of talc. One of the talcs that has proven suitable comes from Mondo Minerals. The average particle size of the talc is generally from 0.5 to 10 micrometers, preferably from 1 to 8 micrometers, particularly preferably from 1 to 3 micrometers.

Interestingly, it has been found that the addition of calcium carbonate iii (chalk) can achieve a further improvement in the biodegradability of the items. An effective increase in the modulus of elasticity can in turn be achieved with talc iv.

Further polyesters, in particular polylactic acid (PLA), and/or starch can also be used (component v) alongside components i and ii.

It is preferable to use polylactic acid with the following property profile:
melt volume rate (MVR for 190° C. and 2.16 kg to ISO 1133) of from 0.5 to 30 ml/10 minutes, in particular from 2 to 9 ml/10 minutes
melting point below 240° C.;
glass transition temperature (Tg) above 55° C.
water content smaller than 1000 ppm
residual monomer content (lactide) smaller than 0.3%
molecular weight above 80 000 daltons.

Examples of preferred polylactic acids are NatureWorks® 6201 D, 6202 D, 6251 D, 3051 D, and in particular 4020 D, 4032D or 4043D (polylactic acid from NatureWorks).

Organic fillers, such as starch or amylose, can moreover be added to the polyester mixture. Starch and amylose can be native, i.e. not thermoplastified, or can have been thermoplastified with plasticizers, such as glycerol or sorbitol (EP-A 539 541, EP-A 575 349, EP 652 910).

The amount used of component v is generally from 0 to 30% by weight, preferably from 3 to 15% by weight, and with particular preference from 5 to 10% by weight, based on components i to vi.

Component vi used comprises from 0 to 2% by weight, preferably from 0.1 to 1.5% by weight, particularly preferably from 0.5 to 1.2% by weight, based on the total weight of components i to vi, of 2-(4,6-bisbiphenyl-4-yl-1,3,5-triazin-2-yl)-5-(2-ethyl-(n)-hexyloxy)phenol. WO 2009/071475 discloses the production and properties of the UV absorber vi. Explicit reference is made to WO 2009/071475 in this connection.

The materials can also comprise other minerals alongside the fillers iii and iv, such as: graphite, gypsum, conductive carbon black, iron oxide, calcium chloride, kaolin, silicon dioxide (quartz), sodium carbonate, titanium dioxide, silicate, wollastonite, mica, montmorillonites, and mineral fibers. The minerals can also be used in the form of nanofillers.

Nanofillers are in particular fine-particle phyllosilicates, preferably clay minerals, particularly preferably clay minerals comprising montmorillonite, where the surface of these has been modified with one or more quaternary ammonium salts and/or phosphonium salts and/or sulfonium salts. Preferred clay minerals are natural montmorillonites and bentonites.

The polyester foil of the invention can also comprise other additives known to the person skilled in the art, examples being the additives usually used in plastics technology, e.g. stabilizers; nucleating agents; lubricants and release agents, e.g. stearates (in particular calcium stearate); plasticizers, e.g. citric esters (in particular tributyl acetylcitrate), Glycerol esters, e.g. triacetylglycerol, or ethylene glycol derivatives, surfactants, e.g. polysorbates, palmitates, or laurates; waxes, e.g. erucamide, stearamide, or behenamide, beeswax or beeswax esters; antistatic agents, UV absorbers; UV stabilizers; antifogging agents, or dyes. The concentrations used of the additives are from 0 to 5% by weight, in particular from 0.1 to 2% by weight, based on the polyesters of the invention. The polyesters of the invention can comprise from 0.1 to 10% by weight of plasticizers.

Other materials that can be added to the polymer mixtures, in particular to the mixtures comprising polylactic acid, are from 0 to 1% by weight, preferably from 0.01 to 0.8% by weight, particularly preferably from 0.05 to 0.5% by weight, based on the total weight of components i to vi, of a copolymer which comprises epoxy groups and is based on styrene, acrylate, and/or methacrylate. The units bearing epoxy groups are preferably glycidyl (meth)acrylates. Copolymers which have proven advantageous are those having glycidyl methacrylate content greater than 20% by weight in the copolymer, particularly preferably greater than 30% by weight, and with particular preference greater than 50% by weight. The epoxy equivalent weight (EEW) in said polymers is preferably from 150 to 3000 g/equivalent, and with particular preference from 200 to 500 g/equivalent. The average molecular weight (weight average) $M_w$ of the polymers is preferably from 2000 to 25 000, in particular from 3000 to 8 000. The average molecular weight (number average) $M_n$ of the polymers is preferably from 400 to 6 000, in particular from 1000 to 4 000. Polydispersity (Q) is generally from 1.5 to 5. Epoxidated copolymers of the abovementioned type are marketed by way of example by BASF Resins B. V. with trademark Joncryl® ADR. Joncryl® ADR 4368 is particularly suitable.

For the purposes of the present invention, a substance or substance mixture complies with the "biodegradable" feature if the percentage degree of biodegradation of said substance or the substance mixture to DIN EN 13432 is at least 90%.

Biodegradation generally leads to decomposition of the polyesters or polyester mixtures in an appropriate and demonstrable period of time. The degradation can take place by an enzymatic, hydrolytic, or oxidative route, and/or via exposure to electromagnetic radiation, such as UV radiation, and can mostly be brought about predominantly via exposure to microorganisms, such as bacteria, yeasts, fungi, and algae. Biodegradability can be quantified by way of example by mixing polyester with compost and storing it for a particular period. By way of example, in DIN EN 13432 (with reference to ISO 14855), $CO_2$-free air is passed through ripened compost during the composting process, and the compost is subjected to a defined temperature profile. Biodegradability here is defined as a percentage degree of biodegradation, by taking the ratio of the net amount of $CO_2$ released from the specimen (after subtraction of the amount of $CO_2$ released by the compost without specimen) to the maximum amount of $CO_2$ that can be released from the specimen (calculated from the carbon content of the specimen). Biodegradable polyesters or biodegradable polyester mixtures generally exhibit clear signs of degradation after just a few days of composting, examples being fungal growth, cracking, and perforation.

Other methods of determining biodegradability are described by way of example in ASTM D 5338 and ASTM D 6400-4.

The biodegradable polyester foils mentioned in the introduction are suitable for producing nets and fabric, blown films, and chill-roll films, with or without any orientation, in a further processing step, and with or without metallization, or SiOx coating.

In particular, the polyester foils defined in the introduction comprising components i) to v) or, respectively, i) to vi) are suitable for blown films and stretch films. Possible applications here are basal-fold bags, lateral-seam bags, carrier bags with hole grip, shrink labels, or vest-style carrier bags, inliners, heavy-duty bags, freezer bags, composting bags, agricultural foils (mulch foils), film bags for food packaging, peelable closure film—transparent or opaque—weldable closure film—transparent or opaque, sausage casing, salad film, freshness-retention film (stretch film) for fruit and vegetables, meat, and fish, stretch film for pallet-wrapping, net film, packaging films for snacks, chocolate bars, and muesli bars, peelable lid films for dairy packaging (yoghurt, cream, etc.), fruit, and vegetables, semirigid packaging for smoked sausage and for cheese.

When the polyester films comprising components i to vi) have been extruded to give single- or multilayer blown, cast, or pressed films they exhibit markedly higher tear-propagation resistance (to EN ISO 6383-2:2004) in comparison with mixtures without components ii to v). Tear-propagation resistance is a very important product property especially in the sector of thin (blown) films for, for example, biodegradable-waste bags, or thin-walled carrier bags (e.g. vest-style carrier bags, fruit bags). It is also particularly important in mulch foils in the agricultural sector.

Polyester foils provided with light stabilizer vi) are in particular used for outdoor applications, for example in the construction sector and in particular for agricultural products. The expression "agricultural products" means mulch foils, protective covering films, silo films, film strips, fabrics, nonwovens, clips, textiles, threads, fishing nets and wrapping, e.g. heavy-duty bags for, for example, peat, fertilizer, cement, plant-protection agents, or seed, or for flower pots.

Agricultural products generally have exposure to wind and weathering, and in particular to insolation. They require stabilization in order to provide a defined service time in the field. Component vi) has proven to be particularly efficient here.

The mixtures of components i and ii and optionally iii to vi can be used in the stated mixing range with excellent results to produce very thin foils measuring by way of example from 10 to 20 μm (micrometers) which have good properties for applications as, for example, biodegradable-waste bags, carrier bags, or mulch foil.

Within said mixing range, the foils feature excellent mechanical properties (very high tensile strengths, tensile strain values, tear-propagation resistance values) together with very high transparency.

The abovementioned foils with good tear-propagation resistance can be produced with particular advantage on a blown-film plant. A precondition for this is—as mentioned above—particular properties, in particular the flow behavior and the bubble stability of the polymer mixtures used. When the polymer mixtures of the invention are compared with mixtures having a higher proportion of polyhydroxyalkanoates, they exhibit markedly higher bubble stability and thus permit the production of substantially thinner and more uniform foils. Addition of mineral fillers further improves tear-propagation resistance values and also leads to greater uniformity of tear behavior in the longitudinal and transverse direction of the foils.

Blown-film production or blown-film extrusion can by way of example be carried out as described in EP 1491319 or in the experimental section. The polymer mixture is produced in an extruder at from 150 to 250° C., preferably from 160 to 220° C., and forced through a suitable annular die. High throughputs of up to 1500 kg/h can be achieved with the polymer mixtures of the invention. Blow-up ratios can preferably be adjusted via the take-off speed to from 2:1 to 6:1, and with particular preference to from 3:1 to 5:1.

Performance Tests:

The tensile tests were carried out on rectangular foil strips of the stated thickness to ISO 527-3 under standard conditions of temperature and humidity: 50% humidity and 23° C. Modulus of elasticity was determined at a velocity of 1 mm/min, and the remaining data were determined at a stretching velocity of 125 mm/min.

Puncture resistance values (penetration energy) were determined on a Zwick 1120 using a lubricated probe of width 2.5 mm. Test velocity was 500 mm/min, using a 500N force transducer and a pretensioning force of 0.2N.

Total transmittance, haze to ASTM D 1003, and clarity were measured on haze-gard plus equipment from BYK Gardner at the foil thickness stated.

Film-bubble stability was assessed during processing, subjectively and on the basis of thickness distribution, and grades of very good (++), good (+), moderate (o), poor (−), to very poor (−−) were awarded.

Tear-propagation resistance was determined via an Elmendorf test to EN ISO 6383-2:2004 using equipment from Pro-Tear on test specimens with constant radius (tear length 43 mm).

I. Materials Used:
i semiaromatic polyester (component i)
   i-1) polybutylene adipate terephthalate: Ecoflex F Blend C1200 (previously Ecoflex FBX 7011) from BASF SE
ii Polyhydroxyalkanoate (component ii)
   ii-1) Poly-3-hydroxybutyrate-co-3-hydroxyhexanoate having 11% hexanoate comonomer content from Kaneka (trade name Aonilex).
iii Calcium carbonate (component iii)
   iii-1) calcium carbonate with topcut (d98%) of 5 micrometers from OMYA
   iii-2) Masterbatch: 60% Masterbatch of OMYA BLS CaCO3 in component i
iv Talc (component iv)
   iv-1) Talc with topcut (d98%) of 8 micrometers from Mondo Minerals
v Polylactic acid (component v)
   v-1) Polylactic acid (PLA) 4043 D from Natureworks LLC
Other Starting Materials:
vii-1) Masterbatch: 10% by weight Masterbatch of erucamide in component i
General Production Specifications for Polymer Mixtures Production Specification 1

Inventive Examples 1 to 5 and Comparative Examples 6 and 8

For inventive examples 1 to 5 and comparative examples 6 and 8, the amounts specified in table 1 were compounded in a Werner & Pfleiderer MC-26 extruder at a zone temperature of 150° C. and a melt temperature of at most 187° C. (measured by sampling the extrudate of the die plate). Components i-1, ii-1, iii-2, v-1, and vii-1 were metered by the Coldfeed method into zone 0. Components iii-1 and iv-1 were metered into 3 one 4 via sidefeeder and the intrained air was removed upstream in zone 3 via vacuum venting.

Production Specification 2

Comparative Example 7

For comparative example 7, the amounts specified in table 1 were compounded in a Werner & Pfleiderer ZSK-30 extruder at a zone temperature of 150° C. and a melt temperature of at most 185° C. (measured by sampling the extrudate of the die plate). Components i-1, iii-2, and vii-1 were metered into zone 0 by the Coldfeed method, and ii-1 was added via sidefeeder in zone 5.

Film-Blowing Plant:

The blown-film plant was operated with an extruder of length 25D with a 45 mm screw equipped with a grooved feed zone and with a three-zone screw with shearing section and mixing section. The feed zone was cooled with cold water at maximum throughput. The zone temperatures were selected in such a way as to give a melt temperature of from 170 to 190° C. The die temperatures were in the range from 165-185° C. Die diameter was 75 mm, and gap width was 0.8 mm. The blow-up ratio of 3.5:1 gave a collapsed width of 412 mm for the film bubble.

The compounding materials were processed to give blown films with various thicknesses on the film plant.

TABLE 1

Production formulations (% by weight) for polymer mixtures of inventive examples 1 to 5 and comparative examples 6 to 8:

| Starting materials | Comp. Ex. 1 | Comp. Ex. 2 | Comp. Ex. 3 | Ex. 4 | Ex. 5 | Comp. ex. 6 | Comp. ex. 7 | Comp. ex. 8 |
|---|---|---|---|---|---|---|---|---|
| i-1* | 90 | 90 | 90 | 90 | 89 | 75 | 47 | 100 |
| ii-1* | 10 | 10 | 10 | 10 | 11 | 25 | 53 | |
| iii-1** | | 15 | 20 | 20 | 20 | | | |
| iii-2** | | | | | | | 4 | 4 |
| iv-1** | | | | 5 | 5 | | | |
| v-1** | | | | | | 11 | | |
| vii-1** | 1 | | | | | 1 | 1 | 1 |

*based on components i and ii
**based on the entirety of components i to v

TABLE 2

Mechanical data for blown films from inventive examples 1 to 5 and comparative examples 6 to 8:

| Test | Unit | Comp. Ex. 1 | | | Comp. Ex. 2 | | Comp. Ex. 3 | | | Ex. 4 | | Ex. 5 | |
|---|---|---|---|---|---|---|---|---|---|---|---|---|---|
| Foil thickness | μm | 30 | 20 | 12 | 30 | 12 | 30 | 20 | 12 | 30 | 20 | 30 | 12 |
| Longitudinal modulus of elasticity | MPa | 153 | 132 | 150 | 175 | −a) | 183 | 171 | 155 | 205 | −a) | 366 | 348 |
| Transverse modulus of elasticity | MPa | 110 | 106 | 117 | 140 | − | 157 | 150 | 139 | 174 | − | 243 | 221 |
| Longitudinal tensile strength (σ-M) | MPa | 46.6 | 45.3 | 44.3 | 37.2 | − | 32.9 | 25.7 | 25.2 | 26.7 | − | 23.8 | 23.2 |
| Transverse tensile strength (σ-M) | MPa | 51.1 | 32.9 | 31.3 | 42.5 | − | 37.6 | 28.7 | 22.6 | 29.4 | − | 27.0 | 20.0 |
| Longitudinal tensile strain at break (ε-B) | % | 830 | 722 | 422 | 738 | − | 713 | 458 | 316 | 663 | − | 480 | 155 |

TABLE 2-continued

Mechanical data for blown films from inventive examples 1 to 5 and comparative examples 6 to 8:

| | | | | | | | | | | | | | |
|---|---|---|---|---|---|---|---|---|---|---|---|---|---|
| Transverse tensile strain at break (ε-B) | % | 557 | 391 | 445 | 589 | – | 548 | 434 | 346 | 658 | – | 593 | 339 |
| Longitudinal tear-propagation resistance (Elmendorf) | mN | 2495 | 735 | 194 | 2800 | 358 | 2999 | 1522 | 410 | 3054 | 1718 | 2121 | 839 |
| Transverse tear-propagation resistance (Elmendorf) | mN | 2194 | 1422 | 1008 | 2169 | 770 | 2437 | 2051 | 856 | 3098 | 2382 | 1935 | 233 |
| Transmittance | % | – | 91.9 | – | – | – | – | – | – | – | 89.6 | – | – |
| Haze | % | – | 16.7 | – | – | – | – | – | – | – | 98.2 | – | – |
| Clarity | % | – | 98.3 | – | – | – | – | – | – | – | 7.0 | – | – |
| Bubble stability during processing | | ++ | ++ | ++ | + | + | + | + | + | ++ | ++ | ++ | ++ |

| Test | Unit | Comp. Ex. 6 | | Comp. Ex. 8 |
|---|---|---|---|---|
| Foil thickness | μm | 30 | 30 | 15 |
| Longitudinal modulus of elasticity | MPa | 272 | 86 | 83 |
| Transverse modulus of elasticity | MPa | 218 | 75 | 67 |
| Longitudinal tensile strength (σ-M) | MPa | 41.3 | 21.3 | 23.1 |
| Transverse tensile strength (σ-M) | MPa | 63.0 | 32.7 | 25.4 |
| Longitudinal tensile strain at break (ε-B) | % | 907 | 549 | 332 |
| Transverse tensile strain at break (ε-B) | % | 583 | 504 | 339 |
| Longitudinal tear-propagation resistance (Elmendorf) | mN | 4961 | 2532 | 444 |
| Transverse tear-propagation resistance (Elmendorf) | mN | 550 | 2024 | 1056 |
| Transmittance | % | – | – | 93.0- |
| Haze | % | – | – | 27.3 |
| Clarity | % | – | – | 85.2 |
| Bubble stability during processing | | + | ++ | ++ |

[a] only transmittance/haze/clarity and tear-propagation resistance measured.

Comparative example 7 could not be processed to give blown films with uniform thickness distribution, because of inadequate melt strength. Bubble stability was assessed as (--).

Addition of calcium carbonate and talc in inventive examples 4 and 5 gave markedly improved bubble stability during processing. Furthermore, inventive examples 4 and 5 allowed very thin foils with high tear-propagation resistance values in longitudinal and transverse direction to be produced.

The foil of inventive example 5 showed that addition of polylactic acid can achieve a further increase in stiffness in comparison with the foil of inventive example 4.

The invention claimed is:

1. A biodegradable polyester foil comprising:
   i) from 80 to 95% by weight, based on the total weight of components i to ii, of a biodegradable polyester based on aliphatic and aromatic dicarboxylic acids and on an aliphatic dihydroxy compound;
   ii) from 5 to 20% by weight, based on the total weight of components i to ii, of polyhydroxyalkanoate;
   iii) from 10 to 25% by weight, based on the total weight of components i to vi, of calcium carbonate;
   iv) from 3 to 15% by weight, based on the total weight of components i to vi, of talc;
   v) from 0 to 30% by weight, based on the total weight of components i to vi, of polylactic acid and/or starch;
   vi) from 0 to 2% by weight, based on the total weight of components i to vi, of 2-(4,6-bisbiphenyl-4-yl-1,3,5-triazin-2-yl)-5-(2-ethyl-(n)-hexyloxy)phenol;
   wherein the foil has a thickness below 50 micrometers.

2. The biodegradable polyester foil according to claim 1, where the biodegradable polyester (component i) has been selected from the group consisting of: polybutylene adipate terephthalate (PBAT), polybutylene sebacate terephthalate (PBSeT), polybutylene azelate terephthalate (PBAzT), and polybutylene succinate terephthalate (PBST).

3. The biodegradable polyester foil according to claim 1, where the polyhydroxyalkanoate (component ii) is a poly(3-hydroxybutyrate-co-3-hydroxyhexanoate).

4. The biodegradable polyester foil according to claim 1 comprising:
   v) from 5 to 30% by weight, based on the total weight of components i to vi, of polylactic acid and/or starch.

5. The biodegradable polyester foil according to claim 1 comprising:
   vi) from 0.1 to 1.5% by weight, based on the total weight of components i to vi, of 2-(4,6-bisbiphenyl-4-yl-1,3,5-triazin-2-yl)-5-(2-ethyl-(n)-hexyloxy)phenol.

6. The biodegradable polyester foil according to claim 1, wherein the biodegradable polyester foil has a thickness of from 10 to 25 micrometers.

7. A method for producing shopping bags, compost bags, or inliners for biodegradable-waste bins comprising utilizing the polyester foil according to claim 1.

8. A method for producing agricultural products selected from the group consisting of mulch foils, protective covering foils, silo foils, foil strips, fabrics, nonwovens, clips, textiles, threads, fishing nets, wrapping, heavy duty bags, and flower pots comprising utilizing the polyester foil according to claim 5.

9. A process for producing the polyester foil according to claim 1 via a blown-film process, which comprises a blow-up ratio of from 2:1 to 6:1.

* * * * *